US012769738B2

(12) United States Patent
Breß et al.

(10) Patent No.: US 12,769,738 B2
(45) Date of Patent: Oct. 20, 2026

(54) DYNAMIC PREDICATE REORDERING AT RUNTIME

(71) Applicant: Snowflake Inc., Bozeman, MT (US)

(72) Inventors: Sebastian Breß, Berlin (DE); Max Heimel, Berlin (DE); Adrian Peter Neumann, Berlin (DE); Malek Souissi, Berlin (DE); Konstantinos Zoumpatianos, Berlin (DE)

(73) Assignee: Snowflake Inc., Bozeman, MT (US)

( * ) Notice: Subject to any disclaimer, the term of this patent is extended or adjusted under 35 U.S.C. 154(b) by 0 days.

(21) Appl. No.: 18/677,526

(22) Filed: May 29, 2024

(65) Prior Publication Data

US 2025/0371011 A1 Dec. 4, 2025

(51) Int. Cl.
*G06F 16/2453* (2019.01)
*G06F 11/34* (2006.01)

(52) U.S. Cl.
CPC .... *G06F 16/24545* (2019.01); *G06F 11/3409* (2013.01); *G06F 16/24549* (2019.01)

(58) Field of Classification Search
CPC ........... G06F 16/24545; G06F 16/2453; G06F 16/24549; G06F 11/3409
USPC ........................................................ 707/718
See application file for complete search history.

(56) References Cited

U.S. PATENT DOCUMENTS 9,659,057 B2 * 5/2017 Tian .................... G06F 16/2471
12,061,603 B1 * 8/2024 Willems .............. G06F 16/2456
2019/0384845 A1 * 12/2019 Saxena ............. G06F 16/24545
2024/0111745 A1 * 4/2024 Wendel, III ....... G06F 16/24558
2024/0134858 A1 * 4/2024 Schieferstein .... G06F 16/24549

OTHER PUBLICATIONS

Hellerstein, Joseph M., et al., "Predicate Migration Optimizing Queries with Expensive Predicates", Proceedings of the 1993 ACM SIGMOD international conference on Management of data, (Jun. 1993), 10 pages.
Menon, Prashanth, et al., "Permutable Compiled Queries Dynamically Adapting Compiled Queries without Recompiling", Proceedings of the VLDB Endowment vol. 14 Issue 2, (Oct. 2020), 13 pages.
Zeuch, Steffen, et al., "Non Invasive Progressive Optimization for In Memory Databases", Proceedings of the VLDB Endowment vol. 9 Issue 14, (Oct. 2016), 12 pages.

* cited by examiner

*Primary Examiner* — Shahid A Alam
(74) *Attorney, Agent, or Firm* — Schwegman Lundberg & Woessner, P.A.

(57) ABSTRACT

The subject technology receives a first query plan corresponding to a query, the first query plan comprising a set of predicates. The subject technology receives, during execution of a first portion of the first query plan, a set of rowsets. The subject technology determines a set of metrics for a first number of rows from a plurality of rows, the first number of rows corresponding to a first predicate order. The subject technology determines, using a heuristic, a second predicate order based at least in part on the set of metrics. The subject technology processes, during execution of the first portion of the first query plan using the second predicate order, a second set of rowsets, the second set of rowsets comprising a second plurality of rows that correspond to the first portion of the first query plan that has been executed based on the second predicate order.

18 Claims, 9 Drawing Sheets

DYNAMIC PREDICATE REORDERING AT RUNTIME

TECHNICAL FIELD

Embodiments of the disclosure relate generally to databases and, more specifically, to enabling techniques for dynamic predicate reordering during query execution in a network-based database system.

BACKGROUND

Databases are widely used for data storage and access in computing applications. A goal of database storage is to provide enormous sums of information in an organized manner so that it can be accessed, managed, and updated. In a database, data may be organized into rows, columns, and tables. Databases are used by various entities and companies for storing information that may need to be accessed or analyzed.

A cloud database is a network-based system used for data analysis and reporting that comprises a central repository of integrated data from one or more disparate sources. A cloud database can store current and historical data that can be used for creating analytical reports for an enterprise based on data stored within databases of the enterprise. To this end, data warehouses typically provide business intelligence tools, tools to extract, transform, and load data into the repository, and tools to manage and retrieve metadata.

When certain information is to be extracted from a database, a query statement may be executed against the database data. A cloud database system processes the query and returns certain data according to one or more query predicates that indicate what information should be returned by the query. The data warehouse system extracts specific data from the database and formats that data into a readable form.

BRIEF DESCRIPTION OF THE DRAWINGS

The present disclosure will be understood more fully from the detailed description given below and from the accompanying drawings of various embodiments of the disclosure.

DETAILED DESCRIPTION

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

Figure 1:
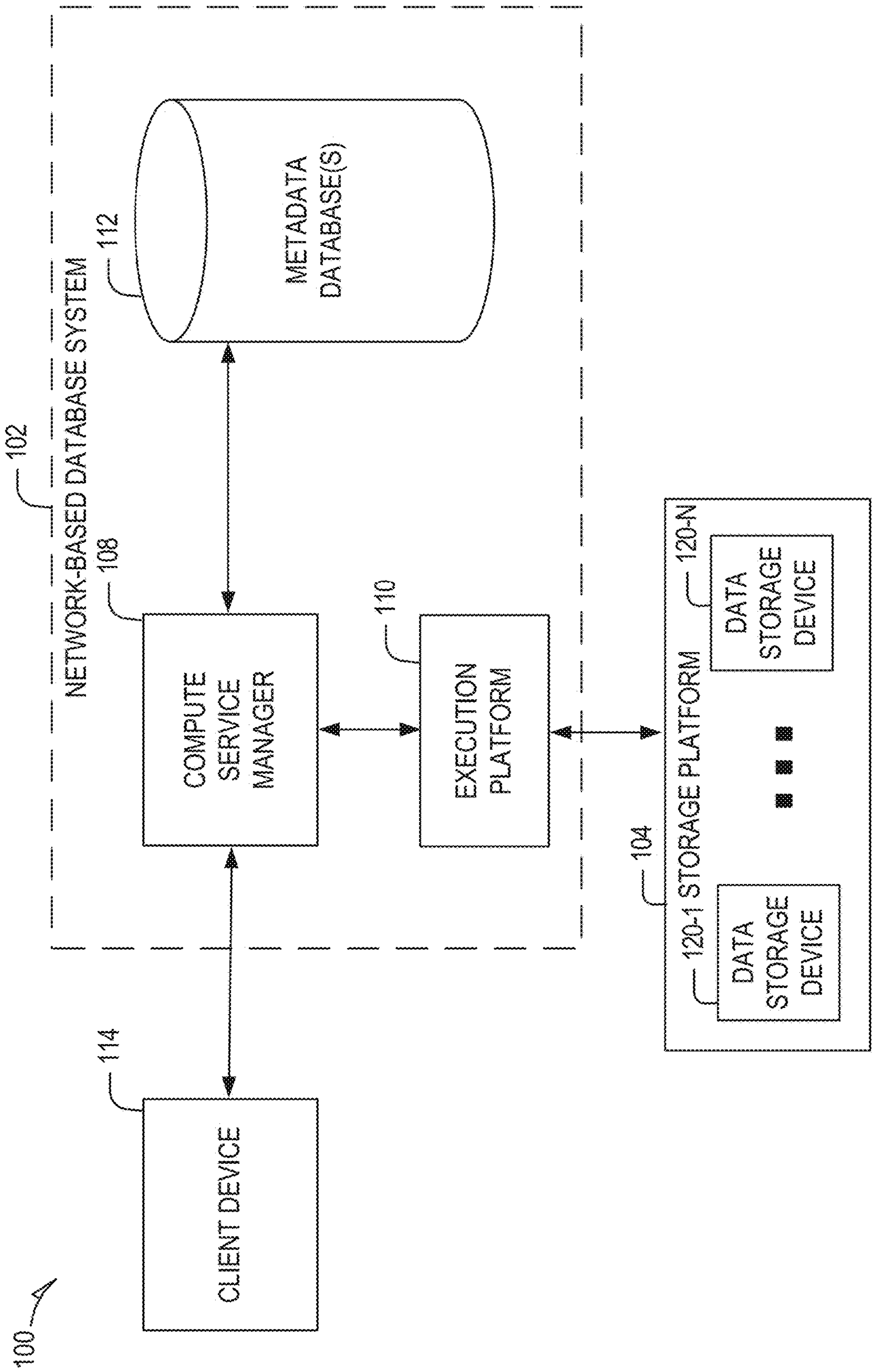
FIG. 1 illustrates an example computing environment that includes a network-based data warehouse system in communication with a cloud storage platform, in accordance with some embodiments of the present disclosure.

FIG. 1 illustrates an example computing environment 100 that includes a database system in the example form of a network-based database system 102, in accordance with some embodiments of the present disclosure. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not specifically described herein. In other embodiments, the computing environment may comprise another type of network-based database system or a cloud data platform.

As shown, the computing environment 100 comprises the network-based database system 102 in communication with a cloud storage platform 104 (e.g., AWS®, Microsoft Azure Blob Storage®, or Google Cloud Storage. The network-based database system 102 is a network-based system used for reporting and analysis of integrated data from one or more disparate sources including one or more storage locations within the cloud storage platform 104. The cloud storage platform 104 comprises a plurality of computing machines and provides on-demand computer system resources such as data storage and computing power to the network-based database system 102.

The network-based database system 102 comprises a compute service manager 108, an execution platform 110, and one or more metadata databases 112. The network-based database system 102 hosts and provides data reporting and analysis services to multiple client accounts.

The compute service manager 108 coordinates and manages operations of the network-based database system 102. The compute service manager 108 also performs query optimization and compilation as well as managing clusters of computing services that provide compute resources (also referred to as "virtual warehouses"). The compute service manager 108 can support any number of client accounts such as end users providing data storage and retrieval requests, system administrators managing the systems and methods described herein, and other components/devices that interact with compute service manager 108.

The compute service manager 108 is also in communication with a client device 114. The client device 114 corresponds to a user of one of the multiple client accounts supported by the network-based database system 102. A user may utilize the client device 114 to submit data storage, retrieval, and analysis requests to the compute service manager 108.

The compute service manager 108 is also coupled to one or more metadata databases 112 that store metadata pertaining to various functions and aspects associated with the network-based database system 102 and its users. For example, a metadata database(s) 112 may include a summary of data stored in remote data storage systems as well as data available from a local cache. Additionally, a metadata database(s) 112 may include information regarding how data is organized in remote data storage systems (e.g., the cloud storage platform 104) and the local caches. Information stored by a metadata database(s) 112 allows systems and services to determine whether a piece of data needs to be accessed without loading or accessing the actual data from a storage device.

In an embodiment, a data structure can be utilized for storage of database metadata in the metadata database(s) 112. For example, such a data structure may be generated from metadata micro-partitions and may be stored in a metadata cache memory. The data structure includes table metadata pertaining to database data stored across a table of the database. The table may include multiple micro-partitions serving as immutable storage devices that cannot be updated in-place. Each of the multiple micro-partitions can include numerous rows and columns making up cells of database data. The table metadata may include a table identification and versioning information indicating, for example, how many versions of the table have been generated over a time period, which version of the table includes the most up-to-date information, how the table was changed over time, and so forth. A new table version may be generated each time a transaction is executed on the table, where the transaction may include a DML statement such as an insert, delete, merge, and/or update command. Each time a DML statement is executed on the table, and a new table version is generated, one or more new micro-partitions may be generated that reflect the DML statement.

In an embodiment, the aforementioned table metadata includes global information about the table of a specific version. The aforementioned data structure further includes file metadata that includes metadata about a micro-partition of the table. The terms "file" and "micro-partition" may each refer to a subset of database data and may be used interchangeably in some embodiments. The file metadata includes information about a micro-partition of the table. Further, metadata may be stored for each column of each micro-partition of the table. The metadata pertaining to a column of a micro-partition may be referred to as an expression property (EP) and may include any suitable information about the column, including for example, a minimum and maximum for the data stored in the column, a type of data stored in the column, a subject of the data stored in the column, versioning information for the data stored in the column, file statistics for all micro-partitions in the table, global cumulative expressions for columns of the table, and so forth. Each column of each micro-partition of the table may include one or more expression properties.

As mentioned above, a table of a database may include many rows and columns of data. One table may include millions of rows of data and may be very large and difficult to store or read. A very large table may be divided into multiple smaller files corresponding to micro-partitions. For example, one table may be divided into six distinct micro-partitions, and each of the six micro-partitions may include a portion of the data in the table. Dividing the table data into multiple micro-partitions helps to organize the data and to find where certain data is located within the table.

In an embodiment, all data in tables is automatically divided into an immutable storage device referred to as a micro-partition. The micro-partition may be considered a batch unit where each micro-partition has contiguous units of storage. By way of example, each micro-partition may contain between 50 MB and 500 MB of uncompressed data (note that the actual size in storage may be smaller because data may be stored compressed).

Groups of rows in tables may be mapped into individual micro-partitions organized in a columnar fashion. This size and structure allow for extremely granular selection of the micro-partitions to be scanned, which can be comprised of millions, or even hundreds of millions, of micro-partitions. This granular selection process may be referred to herein as "pruning" based on metadata as described further herein.

In an example, pruning involves using metadata to determine which portions of a table, including which micro-partitions or micro-partition groupings in the table, are not pertinent to a query, and then avoiding those non-pertinent micro-partitions when responding to the query and scanning only the pertinent micro-partitions to respond to the query. Metadata may be automatically gathered about all rows stored in a micro-partition, including: the range of values for each of the columns in the micro-partition; the number of distinct values; and/or additional properties used for both optimization and efficient query processing. In one embodiment, micro-partitioning may be automatically performed on all tables. For example, tables may be transparently partitioned using the ordering that occurs when the data is inserted/loaded.

The micro-partitions as described herein can provide considerable benefits for managing database data, finding database data, and organizing database data. Each micro-partition organizes database data into rows and columns and stores a portion of the data associated with a table. One table may have many micro-partitions. The partitioning of the database data among the many micro-partitions may be done in any manner that makes sense for that type of data.

A query may be executed on a database table to find certain information within the table. To respond to the query, a compute service manager 108 scans the table to find the information requested by the query. The table may include millions and millions of rows, and it would be very time consuming and it would require significant computing resources for the compute service manager 108 to scan the entire table. The micro-partition organization along with the systems, methods, and devices for database metadata storage of the subject technology provide significant benefits by at least shortening the query response time and reducing the amount of computing resources that are required for responding to the query.

The compute service manager 108 may find the cells of database data by scanning database metadata. The multiple level database metadata of the subject technology enable the compute service manager 108 to quickly and efficiently find the correct data to respond to the query. The compute service manager 108 may find the correct table by scanning table metadata across all the multiple tables in a given database. The compute service manager 108 may find a correct grouping of micro-partitions by scanning multiple grouping expression properties across the identified table. Such grouping expression properties include information about database data stored in each of the micro-partitions within the grouping.

The compute service manager 108 may find a correct micro-partition by scanning multiple micro-partition expression properties within the identified grouping of micro-partitions. The compute service manager 108 may find a correct column by scanning one or more column expression properties within the identified micro-partition. The compute service manager 108 may find the correct row(s) by scanning the identified column within the identified micro-partition. The compute service manager 108 may scan the grouping expression properties to find groupings that have data based on the query. The compute service manager 108 reads the micro-partition expression properties for that grouping to find one or more individual micro-partitions based on the query. The compute service manager 108 reads column expression properties within each of the identified individual micro-partitions. The compute service manager 108 scans the identified columns to find the applicable rows based on the query.

In an embodiment, an expression property is information about the one or more columns stored within one or more micro-partitions. For example, multiple expression properties are stored that each pertain to a single column of a single micro-partition. In an alternative embodiment, one or more expression properties are stored that pertain to multiple columns and/or multiple micro-partitions and/or multiple tables. The expression property is any suitable information about the database data and/or the database itself. In an embodiment, the expression property includes one or more of: a summary of database data stored in a column, a type of database data stored in a column, a minimum and maximum for database data stored in a column, a null count for database data stored in a column, a distinct count for database data stored in a column, a structural or architectural indication of how data is stored, and the like.

In an embodiment, the metadata organization structures of the subject technology may be applied to database "pruning" based on the metadata as described further herein. The metadata organization may lead to extremely granular selection of pertinent micro-partitions of a table. Pruning based on metadata is executed to determine which portions of a table of a database include data that is relevant to a query. Pruning is used to determine which micro-partitions or groupings of micro-partitions are relevant to the query, and then scanning only those relevant micro-partitions and avoiding all other non-relevant micro-partitions. By pruning the table based on the metadata, the subject system can save significant time and resources by avoiding all non-relevant micro-partitions when responding to the query. After pruning, the system scans the relevant micro-partitions based on the query.

In an embodiment, the metadata database(s) 112 includes EP files (expression property files), where each of the EP files store a collection of expression properties about corresponding data. Metadata may be stored for each column of each micro-partition of a given table. In an embodiment, the aforementioned EP files can be stored in a cache provided by the subject system for such EP files (e.g., "EP cache").

The compute service manager 108 is further coupled to the execution platform 110, which provides multiple computing resources that execute various data storage and data retrieval tasks. The execution platform 110 is coupled to storage platform 104 of the cloud storage platform 104. The storage platform 104 comprises multiple data storage devices 120-1 to 120-N. In some embodiments, the data storage devices 120-1 to 120-N are cloud-based storage devices located in one or more geographic locations. For example, the data storage devices 120-1 to 120-N may be part of a public cloud infrastructure or a private cloud infrastructure. The data storage devices 120-1 to 120-N may be hard disk drives (HDDs), solid state drives (SSDs), storage clusters, Amazon S3™ storage systems, or any other data storage technology. Additionally, the cloud storage platform 104 may include distributed file systems (such as Hadoop Distributed File Systems (HDFS)), object storage systems, and the like.

The execution platform 110 comprises a plurality of compute nodes. A set of processes on a compute node executes a query plan compiled by the compute service manager 108. The set of processes can include: a first process to execute the query plan; a second process to monitor and delete cache files using a least recently used (LRU) policy and implement an out of memory (OOM) error mitigation process; a third process that extracts health information from process logs and status to send back to the compute service manager 108; a fourth process to establish communication with the compute service manager 108 after a system boot; and a fifth process to handle all communication with a compute cluster for a given job provided by the compute service manager 108 and to communicate information back to the compute service manager 108 and other compute nodes of the execution platform 110.

In some embodiments, communication links between elements of the computing environment 100 are implemented via one or more data communication networks. These data communication networks may utilize any communication protocol and any type of communication medium. In some embodiments, the data communication networks are a combination of two or more data communication networks (or sub-networks) coupled to one another. In alternate embodiments, these communication links are implemented using any type of communication medium and any communication protocol.

The compute service manager 108, metadata database(s) 112, execution platform 110, and storage platform 104, are shown in FIG. 1 as individual discrete components. However, each of the compute service manager 108, metadata database(s) 112, execution platform 110, and storage platform 104 may be implemented as a distributed system (e.g., distributed across multiple systems/platforms at multiple geographic locations). Additionally, each of the compute service manager 108, metadata database(s) 112, execution platform 110, and storage platform 104 can be scaled up or down (independently of one another) depending on changes to the requests received and the changing needs of the network-based database system 102. Thus, in the described embodiments, the network-based database system 102 is dynamic and supports regular changes to meet the current data processing needs.

During typical operation, the network-based database system 102 processes multiple jobs determined by the compute service manager 108. These jobs are scheduled and managed by the compute service manager 108 to determine when and how to execute the job. For example, the compute service manager 108 may divide the job into multiple discrete tasks and may determine what data is needed to execute each of the multiple discrete tasks. The compute service manager 108 may assign each of the multiple discrete tasks to one or more nodes of the execution platform 110 to process the task. The compute service manager 108 may determine what data is needed to process a task and further determine which nodes within the execution platform

110 are best suited to process the task. Some nodes may have already cached the data needed to process the task and, therefore, be a good candidate for processing the task. Metadata stored in a metadata database(s) 112 assists the compute service manager 108 in determining which nodes in the execution platform 110 have already cached at least a portion of the data needed to process the task. One or more nodes in the execution platform 110 process the task using data cached by the nodes and, if necessary, data retrieved from the cloud storage platform 104. It is desirable to retrieve as much data as possible from caches within the execution platform 110 because the retrieval speed is typically much faster than retrieving data from the cloud storage platform 104.

As shown in FIG. 1, the computing environment 100 separates the execution platform 110 from the storage platform 104. In this arrangement, the processing resources and cache resources in the execution platform 110 operate independently of the data storage devices 120-1 to 120-N in the cloud storage platform 104. Thus, the computing resources and cache resources are not restricted to specific data storage devices 120-1 to 120-N. Instead, all computing resources and all cache resources may retrieve data from, and store data to, any of the data storage resources in the cloud storage platform 104.

Figure 2:
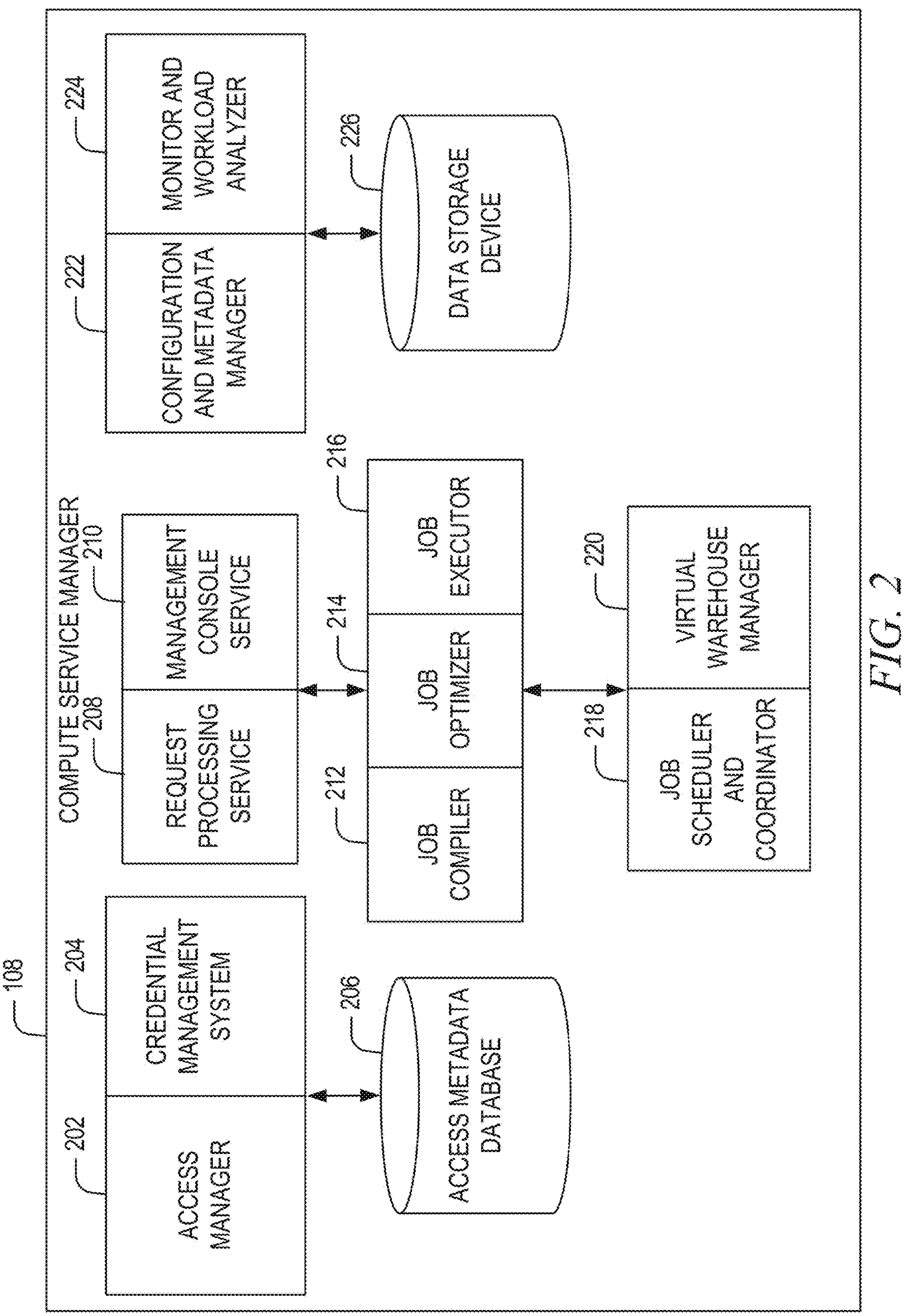
FIG. 2 is a block diagram illustrating components of a compute service manager, in accordance with some embodiments of the present disclosure.

FIG. 2 is a block diagram illustrating components of the compute service manager 108, in accordance with some embodiments of the present disclosure. As shown in FIG. 2, the compute service manager 108 includes an access manager 202 and a credential management system 204 coupled to an access metadata database 206, which is an example of the metadata database(s) 112. Access manager 202 handles authentication and authorization tasks for the systems described herein. The credential management system 204 facilitates use of remote stored credentials to access external resources such as data resources in a remote storage device. As used herein, the remote storage devices may also be referred to as "persistent storage devices" or "shared storage devices." For example, the credential management system 204 may create and maintain remote credential store definitions and credential objects (e.g., in the access metadata database 206). A remote credential store definition identifies a remote credential store and includes access information to access security credentials from the remote credential store. A credential object identifies one or more security credentials using non-sensitive information (e.g., text strings) that are to be retrieved from a remote credential store for use in accessing an external resource. When a request invoking an external resource is received at run time, the credential management system 204 and access manager 202 use information stored in the access metadata database 206 (e.g., a credential object and a credential store definition) to retrieve security credentials used to access the external resource from a remote credential store.

A request processing service 208 manages received data storage requests and data retrieval requests (e.g., jobs to be performed on database data). For example, the request processing service 208 may determine the data to process a received query (e.g., a data storage request or data retrieval request). The data may be stored in a cache within the execution platform 110 or in a data storage device in storage platform 104.

A management console service 210 supports access to various systems and processes by administrators and other system managers. Additionally, the management console service 210 may receive a request to execute a job and monitor the workload on the system.

The compute service manager 108 also includes a job compiler 212, a job optimizer 214 and a job executor 216. The job compiler 212 parses a job into multiple discrete tasks and generates the execution code for each of the multiple discrete tasks. The job optimizer 214 determines the best method to execute the multiple discrete tasks based on the data that needs to be processed. The job executor 216 executes the execution code for jobs received from a queue or determined by the compute service manager 108.

A job scheduler and coordinator 218 sends received jobs to the appropriate services or systems for compilation, optimization, and dispatch to the execution platform 110. For example, jobs may be prioritized and then processed in that prioritized order. In an embodiment, the job scheduler and coordinator 218 determines a priority for internal jobs that are scheduled by the compute service manager 108 with other "outside" jobs such as user queries that may be scheduled by other systems in the database but may utilize the same processing resources in the execution platform 110. In some embodiments, the job scheduler and coordinator 218 identifies or assigns particular nodes in the execution platform 110 to process particular tasks. A virtual warehouse manager 220 manages the operation of multiple virtual warehouses implemented in the execution platform 110. For example, the virtual warehouse manager 220 may generate query plans for executing received queries. Alternatively or conjunctively, the job compiler 212 can generate query plans for executing received queries as discussed further herein.

Additionally, the compute service manager 108 includes a configuration and metadata manager 222, which manages the information related to the data stored in the remote data storage devices and in the local buffers (e.g., the buffers in execution platform 110). The configuration and metadata manager 222 uses metadata to determine which data files need to be accessed to retrieve data for processing a particular task or job. A monitor and workload analyzer 224 oversees processes performed by the compute service manager 108 and manages the distribution of tasks (e.g., workload) across the virtual warehouses and execution nodes in the execution platform 110. The monitor and workload analyzer 224 also redistributes tasks, as needed, based on changing workloads throughout the network-based database system 102 and may further redistribute tasks based on a user (e.g., "external") query workload that may also be processed by the execution platform 110. The configuration and metadata manager 222 and the monitor and workload analyzer 224 are coupled to a data storage device 226. Data storage device 226 in FIG. 2 represents any data storage device within the network-based database system 102. For example, data storage device 226 may represent buffers in execution platform 110, storage devices in storage platform 104, or any other storage device.

As described in embodiments herein, the compute service manager 108 validates all communication from an execution platform (e.g., the execution platform 110) to validate that the content and context of that communication are consistent with the task(s) known to be assigned to the execution platform. For example, an instance of the execution platform executing a query A should not be allowed to request access to data-source D (e.g., data storage device 226) that is not relevant to query A. Similarly, a given execution node (e.g., execution node 302-1 may need to communicate with another execution node (e.g., execution node 302-2), and should be disallowed from communicating with a third execution node (e.g., execution node 312-1) and any such illicit communication can be recorded (e.g., in a log or other location). Also, the information stored on a given execution node is restricted to data relevant to the current query and any other data is unusable, rendered so by destruction or encryption where the key is unavailable.

Figure 3:
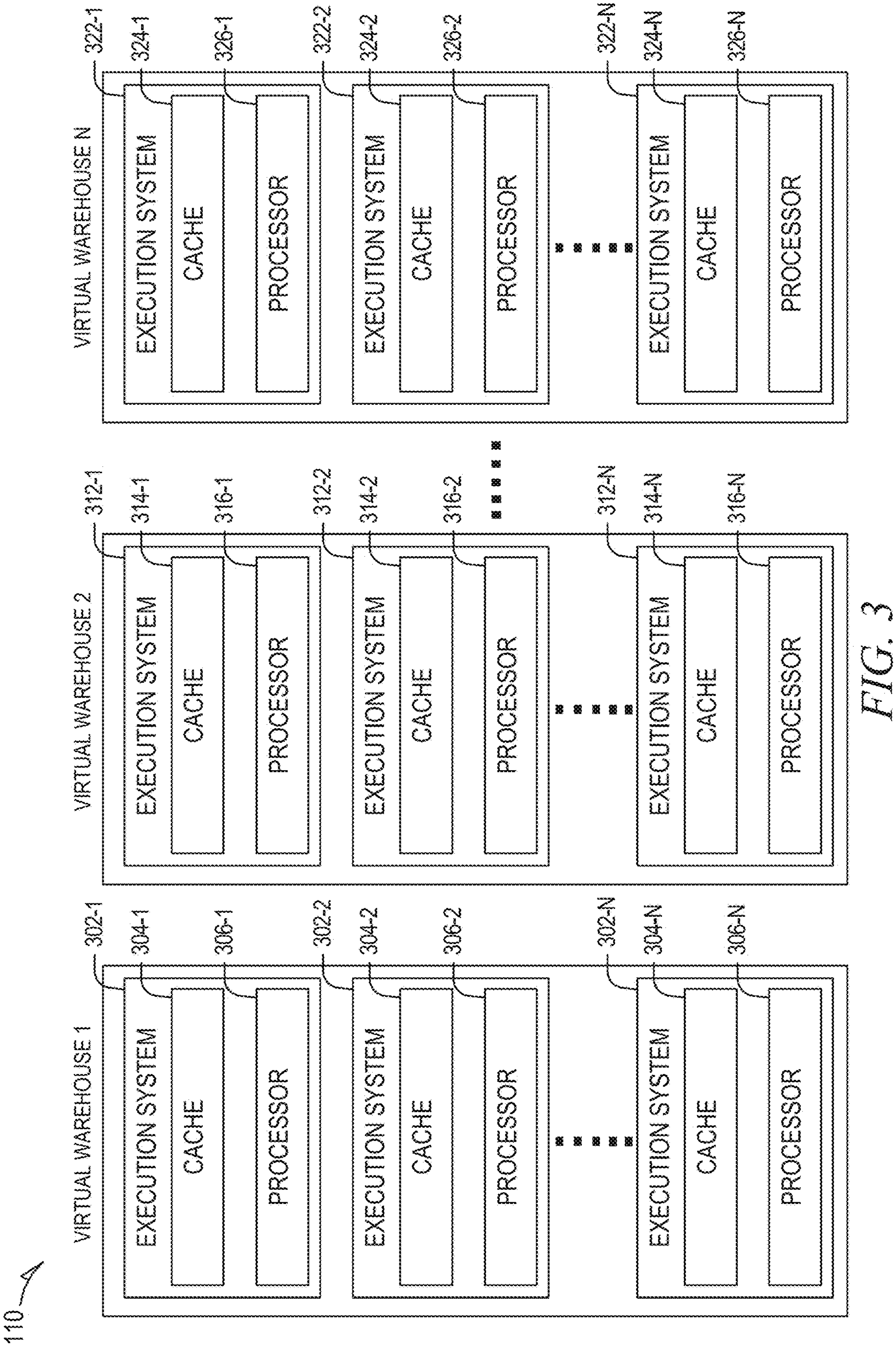
FIG. 3 is a block diagram illustrating components of an execution platform, in accordance with some embodiments of the present disclosure.

FIG. 3 is a block diagram illustrating components of the execution platform 110, in accordance with some embodiments of the present disclosure. As shown in FIG. 3, the execution platform 110 includes multiple virtual warehouses, including virtual warehouse 1, virtual warehouse 2, and virtual warehouse n. Each virtual warehouse includes multiple execution nodes that each include a data cache and a processor. The virtual warehouses can execute multiple tasks in parallel by using the multiple execution nodes. As discussed herein, the execution platform 110 can add new virtual warehouses and drop existing virtual warehouses in real-time based on the current processing needs of the systems and users. This flexibility allows the execution platform 110 to quickly deploy large amounts of computing resources when needed without being forced to continue paying for those computing resources when they are no longer needed. All virtual warehouses can access data from any data storage device (e.g., any storage device in cloud storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary.

Each virtual warehouse is capable of accessing any of the data storage devices 120-1 to 120-N shown in FIG. 1. Thus, the virtual warehouses are not necessarily assigned to a specific data storage device 120-1 to 120-N and, instead, can access data from any of the data storage devices 120-1 to 120-N within the cloud storage platform 104. Similarly, each of the execution nodes shown in FIG. 3 can access data from any of the data storage devices 120-1 to 120-N. In some embodiments, a particular virtual warehouse or a particular execution node may be temporarily assigned to a specific data storage device, but the virtual warehouse or execution node may later access data from any other data storage device.

In the example of FIG. 3, virtual warehouse 1 includes three execution nodes 302-1, 302-2, and 302-*n*. Execution node 302-1 includes a cache 304-1 and a processor 306-1. Execution node 302-2 includes a cache 304-2 and a processor 306-2. Execution node 302-*n* includes a cache 304-*n* and a processor 306-*n*. Each execution node 302-1, 302-2, and 302-*n* is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-*n*. Execution node 312-1 includes a cache 314-1 and a processor 316-1. Execution node 312-2 includes a cache 314-2 and a processor 316-2. Execution node 312-*n* includes a cache 314-*n* and a processor 316-*n*. Additionally, virtual warehouse 3 includes three execution nodes 322-1, 322-2, and 322-*n*. Execution node 322-1 includes a cache 324-1 and a processor 326-1. Execution node 322-2 includes a cache 324-2 and a processor 326-2. Execution node 322-*n* includes a cache 324-*n* and a processor 326-*n*.

In some embodiments, the execution nodes shown in FIG. 3 are stateless with respect to the data being cached by the execution nodes. For example, these execution nodes do not store or otherwise maintain state information about the execution node or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each includes one data cache and one processor, alternate embodiments may include execution nodes containing any number of processors and any number of caches. Additionally, the caches may vary in size among the different execution nodes. The caches shown in FIG. 3 store, in the local execution node, data that was retrieved from one or more data storage devices in cloud storage platform 104. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some embodiments, the caches are implemented using high-speed memory devices that provide fast access to the cached data. Each cache can store data from any of the storage devices in the cloud storage platform 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor-intensive. Similarly, an execution node may be assigned more cache resources if the tasks performed by the execution node require a larger cache capacity.

Although virtual warehouses 1, 2, and n are associated with the same execution platform 110, the virtual warehouses may be implemented using multiple computing systems at multiple geographic locations. For example, virtual warehouse 1 can be implemented by a computing system at a first geographic location, while virtual warehouses 2 and n are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, an instance of virtual warehouse 1 implements execution nodes 302-1 and 302-2 on one computing platform at a geographic location and implements execution node **302-*n*** at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 110 is also fault tolerant. For example, if one virtual warehouse fails, that virtual warehouse is quickly replaced with a different virtual warehouse at a different geographic location.

A particular execution platform 110 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted (e.g., shut down) when the resources associated with the virtual warehouse are no longer necessary.

In some embodiments, the virtual warehouses may operate on the same data in cloud storage platform 104, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without significantly impacting the performance observed by the existing users.

Embodiments of the subject technology enable automatic tuning of a predicate order at runtime based on the actual data being processed and not based on (possibly inaccurate) estimations.

For a given query plan, a predicate order chosen at compile time might be inefficient for query execution. Data distribution may change and a static order of evaluation of predicates can cause a greater utilization of computing resources for many queries.

In some existing approaches, compile-time tuning of the predicate order is based on cardinality estimations and/or evaluation of data samples. This can be difficult to achieve with some metadata architecture(s).

The subject technology advantageously adapts predicate ordering to changing data distributions to provide performance improvements in the subject system. Approaches described herein have low to no overhead implementations, and in combination with other query processing optimizations (e.g., filter pushdown, dictionary memoization, compression block pruning/skipping), the described runtime reordering herein has significant performance improvement. Additionally, embodiments provide a feedback mechanism that can ensure the predicate reordering improves performance.

At different occasions during the execution of a query, a series of filter expressions has to be evaluated such that given a set of input rows, a subset of these rows is returned as output that passes (e.g., satisfies the predicate) all the filter expressions (in case of a conjunction) or at least one of the filter expressions (in case of a disjunction). For optimizing performance, "short circuiting" is performed during the evaluation of these filter expressions. As a consequence, the order in which these filter expressions are evaluated matters for performance reasons.

The subject technology optimizes the order in which these filters are evaluated periodically at runtime based on statistics gathered about the evaluated filter expressions. This decision is based on the selectivity and computation cost of the expressions. For example, a heuristic, which combines the selectivity and computation cost of the expressions, is used to estimate an optimal order of filters.

As referred to herein, in the context of an SQL statement, the selectivity of a predicate refers to the fraction of rows in a table that satisfy the predicate. Selectivity, as discussed herein, can help estimate the cost and choose the best execution plan, especially when dealing with operations like joins, indexes, and filters. In an example, selectivity is understood as a ratio of the number of rows that satisfy the predicate to the total number of rows that are processed by the predicate. The value of selectivity can range from 0 to 1, where 0 means no rows satisfy the condition (highly selective), and 1 means all rows satisfy the condition (not selective).

The subject technology can ensure that the order changes do not slow down the performance and revert the change in such a case. The subject technology can ensure that reordering the predicates does not change the behavior of the query and does not introduce new errors. This is done by partially reordering the predicates and/or forcing re-evaluation in case of errors. Further, the subject technology combines this optimization technique(s) with other optimizations to further improve performance, for example, by changing the order in which projections are evaluated, leading to delaying the evaluation of computationally expensive functions until more data (e.g., from rowsets) has been filtered out.

In the discussion herein, a "predicate" can refer to an expression that evaluates to True or False, and a filter refers to an operation for taking a selection of rows and returning a subset selection of the input rows that satisfy an underlying predicate.

Figure 4:
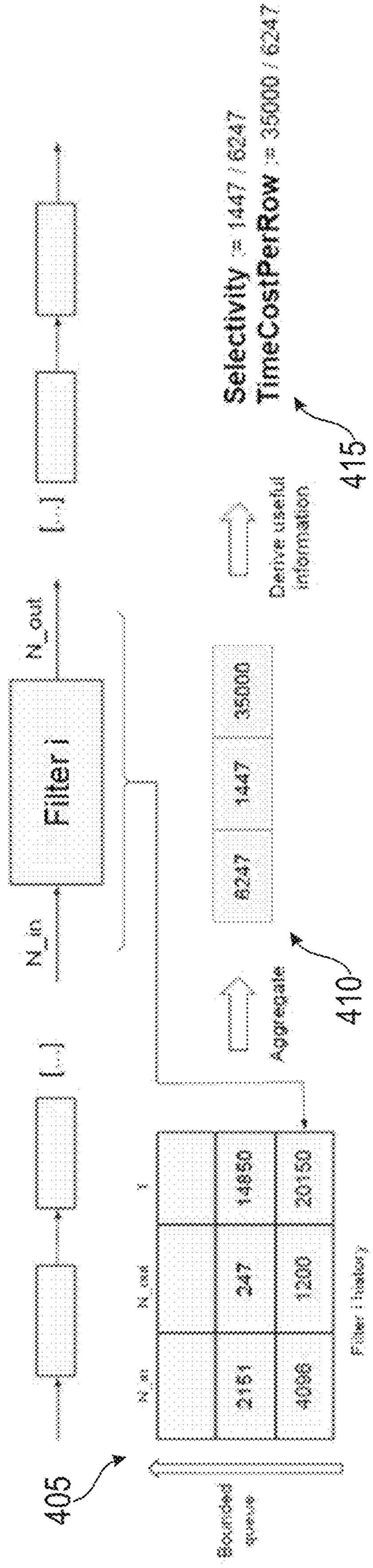
FIG. 4 illustrates an example processing flow for a set of operations for gathering predicate statistics at query runtime (e.g., during query execution), in accordance with some embodiments of the present disclosure.

FIG. 4 illustrates an example processing flow for a set of operations for gathering predicate statistics at query runtime (e.g., during query execution), in accordance with some embodiments of the present disclosure.

The example processing flow in FIG. 4 conceptually illustrates a set of rows 405 that undergo a filtering operation. As shown, a set of information 410 is determined based on the results of the filtering operation. From the set of information 410, a set of metrics 415 is derived where a selectivity metric and an evaluation cost per row metric can be determined. In the example of FIG. 4, the selectivity metric is determined based on a ratio of a number of rows that have been selected by a predicate to a total number of rows that were processed by the predicate. The evaluation cost per row metric, in this example, can be determined taking a total amount of time for processing the total number of rows and dividing this by the total number of rows that were processed by the predicate. In an example, the total amount of time for processing the total number of rows is based on an aggregate amount of time spent for processing the total number of rows.

In this example, to be able to estimate the optimal order of predicates, a given execution node (e.g., execution node 302-1) determines metrics for the selectivity and evaluation cost (e.g., measured in time) of each predicate at runtime (e.g., query execution).

For each evaluated predicate, the execution node tracks various statistics including a number of processed rows, a number of selected rows, and time spent processing and selecting such rows. A set of collected statistic entries, discussed more below, can then be used to derive metrics related to selectivity and evaluation cost per row.

Since the selectivity and evaluation cost of predicates can change depending on the data distribution, the collected statistic entries are stored in a fixed capacity queue (i.e., tracking the last K entries, with the value of K being the queue's capacity). A fixed capacity queue is a data structure that operates using a First In, First Out (FIFO) technique in which the queue has a predetermined maximum capacity. In an example, such a queue can hold a limited number of elements (e.g., each element corresponding to a particular statistic entry), and when this capacity is reached, no additional elements can be added until space is made available by removing elements from the front of the queue. By using such a queue, the estimated selectivity and evaluation cost are locally accurate. The entries can then be aggregated to determine the estimated selectivity and evaluation cost per row for each predicate.

With respect to a heuristic, after the estimated selectivity and evaluation cost for each predicate, the subject technology can estimate the optimal predicate order by sorting the predicates using the following heuristic:

AND→(1−Selectivity)/timeCostPerRow

OR→Selectivity/timeCostPerRow

The above heuristic includes separate techniques for a conjunctive query statement and a disjunctive query statement. For example, a conjunctive query statement uses the logical AND operator to combine multiple conditions, where all conditions connected by AND must be true for the overall predicate to be true. A disjunctive query statement uses the logical OR operator to combine multiple conditions, and where a row only needs to satisfy at least one of the conditions connected by OR for the overall predicate to be true.

The following discussion relates to a first strategy for reordering a set of predicates based on the aforementioned heuristic.

Figure 5:
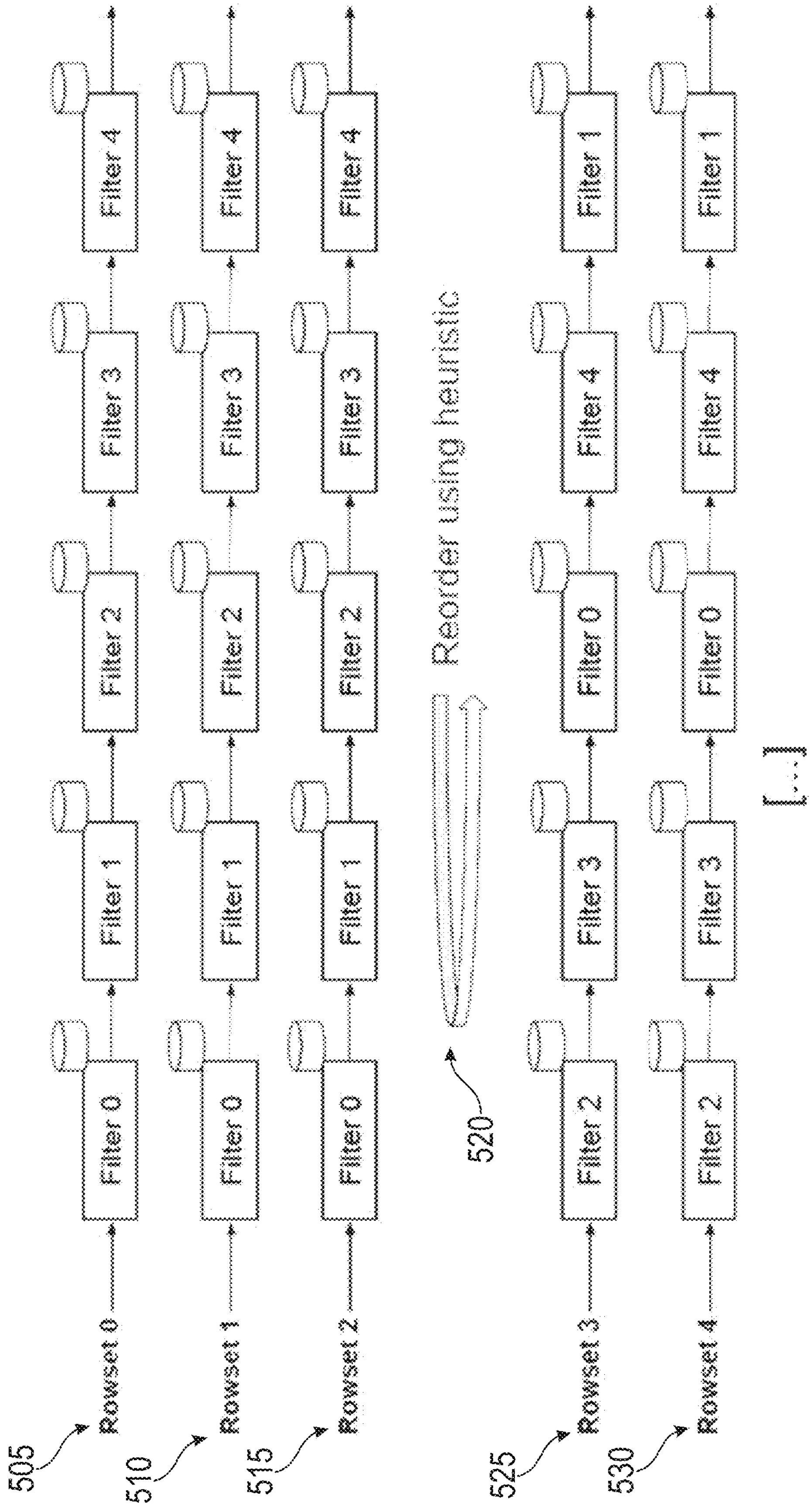
FIG. 5 illustrates an example of a dynamic strategy that aggressively performs reordering of a set of predicates in accordance with embodiments of the subject technology.

FIG. 5 illustrates an example of a dynamic strategy that aggressively performs reordering of a set of predicates in accordance with embodiments of the subject technology.

In the example of FIG. 5, rowset 505, rowset 510, and rowset 515 are processed by a given execution node. A "rowset" (or "row set") refers to a set of rows obtained from a database query that can be manipulated or navigated programmatically. Such rowsets can represent a set of data rows that share a common structure of columns, similar to a table or a result set from an SQL query.

As discussed before, an execution node can collect statistics related to a number of processed rows, a number of selected rows, and a time spent processing and selecting such rows for the aforementioned rows over a K number of rows. In the example of FIG. 5, a default order includes a set of predicates that go from a first predicate (e.g., "Filter 0)" to a fifth predicate (e.g., "Filter 4"). After the K number of rows have been processed, the execution node can perform a reordering operation 520 using the aforementioned heuristic on the set of predicates.

Statistics are collected for each time a predicate is evaluated such that the predicate order is periodically optimized every K number of processed rowsets, with K being a constant value derived from a parameter (e.g., parameter corresponding to a number_of_rowsets_between_reorderings). For every $K^{th}$ call of a function to get a predicate order, another function to optimize predicate order is called to estimate the optimal predicate order from the statistics gathered thus far.

After the predicate order has undergone optimization, a resulting predicate order is utilized for rowset 525 and rowset 530. In the example of FIG. 5, rowset 525 and rowset 530 have a different predicate order than those in rowset 505, rowset 510, and rowset 515.

Given that the collected statistics for each predicate are conditioned on previous predicates being satisfied (in the case of conjunctions), respectfully unsatisfied (in the case of disjunctions, the estimated optimal predicate order can be less performant than the default order. In most cases, after reordering, the statistics gathered using the new predicate order can indicate that the order is not optimal and the order incrementally adapts in the next reordering cycles. However, this is not always the case and alternating between predicate orders can occur where such predicate orders are less efficient than the default order determined at compile time (e.g., during the compilation process of a query). In such an instance, reordering can cause a performance regression.

While the techniques described above can often lead to more efficient predicate order(s), this improvement may not always occur. The following discussion relates to a more conservative approach that can be utilized to help consistently provide a more performant predicate order(s).

Figure 6:
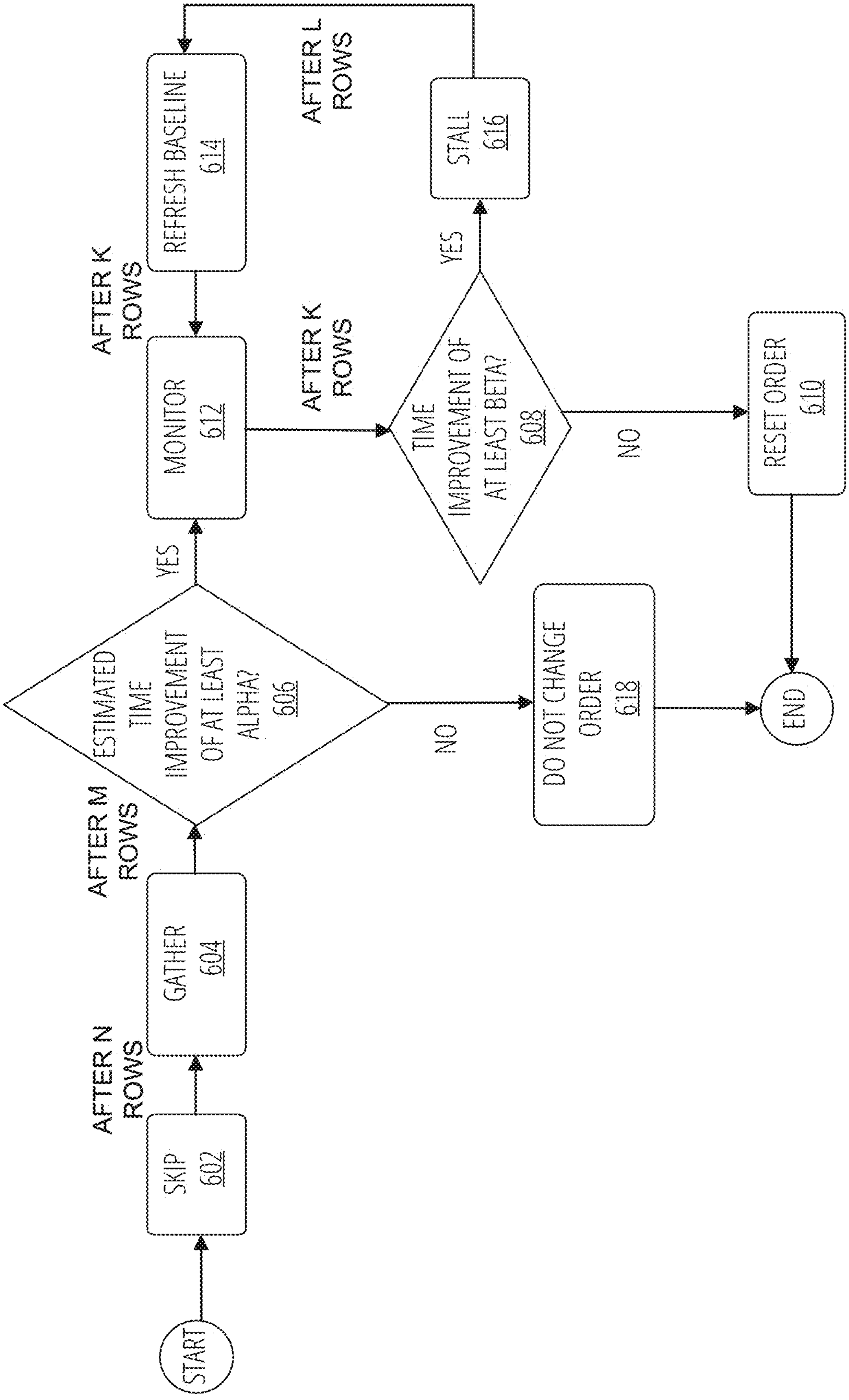
FIG. 6 illustrates an example of a one-off strategy that performs reordering of a set of predicates in accordance with embodiments of the subject technology.

FIG. 6 illustrates an example of a one-off strategy that conservatively performs reordering of a set of predicates in accordance with embodiments of the subject technology.

An example processing flow is shown in FIG. 6, which illustrates different operations performed in a first approach to predicate reordering. The example of FIG. 6 can be understood as a more conservative approach in comparison with the techniques described above in FIG. 5.

In an implementation, the phases/states of the reordering logic in at least FIG. 6 are local to one operator, which is part of one pipeline/portion of a query plan. This pipeline is executed over and over again on the rowsets that the pipeline consumes. Internally, in the operators where the reordering logic is applied, different states could be provided where a particular predicate order and/or statistics collecting could be performed based on the particular state. The aforementioned is exercised when the corresponding operator is executed as part of the pipeline.

The portion of the query plan in action (including the operator where the reordering logic kicks in) is executed over a series of different rowsets (e.g., one rowset after another rowset). In a normal course of action, the execution node is executing a portion of the query plan on a series of rowsets. After some number of rowsets, when it is decided to change the order, the new order is utilized on the next rowsets.

In the example of FIG. 6, an initial predicate order is adjusted while ensuring that a query execution time is improved by tracking an amount of time that elapses during processing a rowset with a default order and an amount of time with a new suggested order. When an improvement in the measured time surpasses a threshold, the new predicate order is maintained for the remainder of the query. Alternatively, when the threshold is not surpassed, the default predicate order is utilized. Further, the default predicate order is periodically reused to refresh the baseline and to repeat the check (e.g., to determine whether an improvement in measured time surpasses the threshold).

In an example, short-running queries are not affected by, for a first N number of rows (e.g., ignoring rowsets with less than 200 rows), any reordering operation is not performed (e.g., in effect forgoing any calls to a predicate order handler). After a sufficient number of rows are processed, reordering operation(s) are performed. As a result, computational overhead to short-running queries is avoided. In an implementation, a state variable is utilized in which each time a rowset is processed, a counter is incremented for the number of rowsets seen in a current state and states can be switched accordingly.

The processing flow initially enters an operation 602 for skipping (e.g., doing nothing), and after an N number of rows then continues to an operation 604 for gathering a set of statistics and rowset times for a default order of predicates. For the first N rowsets, the processing flow is in a DELAY state (e.g., no computation). In an example, such a default order corresponds to a predicate order that is determined by a query compiler as part of a compilation process of a given query (e.g., to generate a query plan based on the query).

For the next M rowsets, the processing flow gathers statistics, then if it is decided to switch to a new order, the new order is utilized for the next K rowsets, and so on. After an M number of rows, the processing flow continues to operation 606 to determine whether an estimated time shows an improvement of at least a particular threshold (e.g., alpha). If the particular threshold is not met (e.g., where the improvement does not equal or surpass the particular threshold), the processing flow moves to operation 618 where the default order is not changed (e.g., remains unchanged from the default order).

If the improvement threshold (e.g., the particular threshold corresponding to alpha) is at least met (e.g., being at least equal to or greater than alpha), the processing flow initiates changing the predicate order by moving to operation 612.

The following discussion relates to a set of operations in FIG. 6 for providing performance regression protection in connection with predicate reordering. At operation 612, a monitoring operation is performed, which can protect against performance regressions, by tracking an average time that has elapsed while processing rowsets using a new predicate order. After processing a K number of rows, if an improvement is at least equal to or greater than a beta threshold (e.g., a second improvement threshold different from the first threshold of alpha), the new predicate order is utilized and the processing flow proceeds to operation 616 where stalling is performed (e.g., the new predicate order is maintained for executing the query). After an L number of rows is processed using the new predicate order, the processing flow transitions to operation 614 to refresh a baseline corresponding to the default order of predicates. At operation 614, the default order is utilized and a set of metrics for rowset times of the default order are determined for a K number of rows that are processed using the default order. The processing flow transitions to operation 612 to determine metrics related to the new order (e.g., as utilized before), and after processing a different K number of rows, the operation 608 is performed again to determine whether an improvement is at least equal to or greater than the beta threshold. The processing can continue in this manner as discussed above to determine whether to keep using the new order (and to again perform another refresh of the baseline), or to reset the order back to the default order.

Alternatively, if the improvement is less than the beta threshold at operation 608, the default predicate order (e.g., determined at compile time of the query) is utilized for the remainder of executing the query and the processing flow transitions to operation 610 to reset the new predicate order to the default predicate order.

Figure 7:
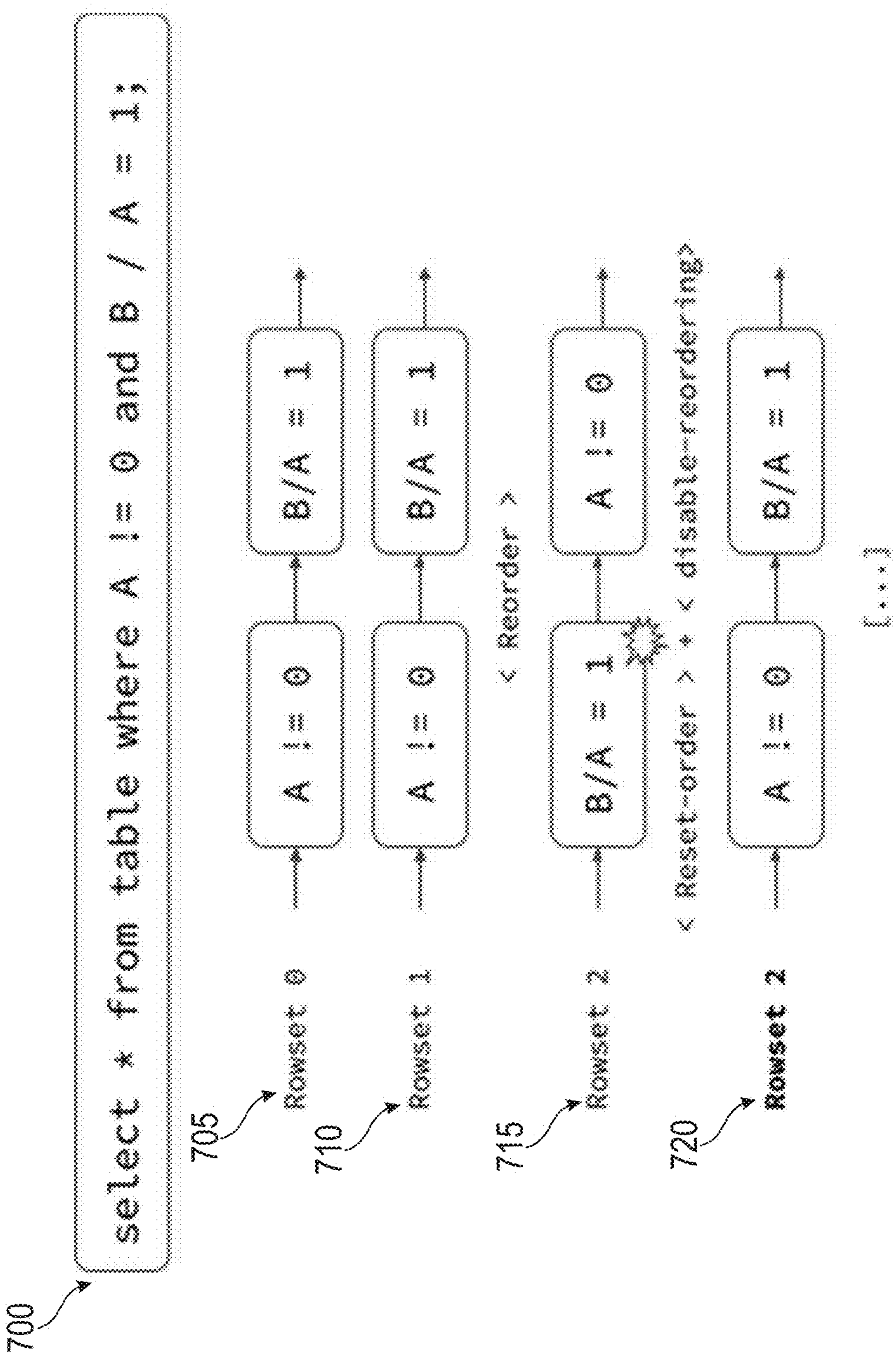
FIG. 7 illustrates an example of handling user errors in at least one embodiment of the subject technology.

FIG. 7 illustrates an example of handling user errors in at least one embodiment of the subject technology.

In the example of FIG. 7, changing the order of predicates can cause user errors that do not originally occur with the default predicate order. As shown, there are two predicates, as illustrated in query 700, where a first predicate determines if a column value A is non-zero and a second predicate divides a value of B by the value of the column value A.

Execution of query 700 can start with processing rowset 705 and rowset 710 (e.g., prior to predicate reordering). A predicate reordering operation is performed on the query, which is shown in the processing of rowset 715. To mitigate potential errors, a given execution node can identify errors that occur while evaluating the reordered child predicates corresponding to rowset 715 and, in response, perform re-evaluation with the default order. When this occurs, the execution node can disable reordering, and the default predicate order is utilized for the remainder of the execution of the query 700 (e.g., as shown in the predicates of rowset 720).

In this manner, the execution node can transparently perform the predicate reordering without a user who submitted query 700 for execution being aware of it. This ensures that the logic associated with a given query (e.g., query 700) remains usable, as intended by the user, within the subject system.

Figure 8:
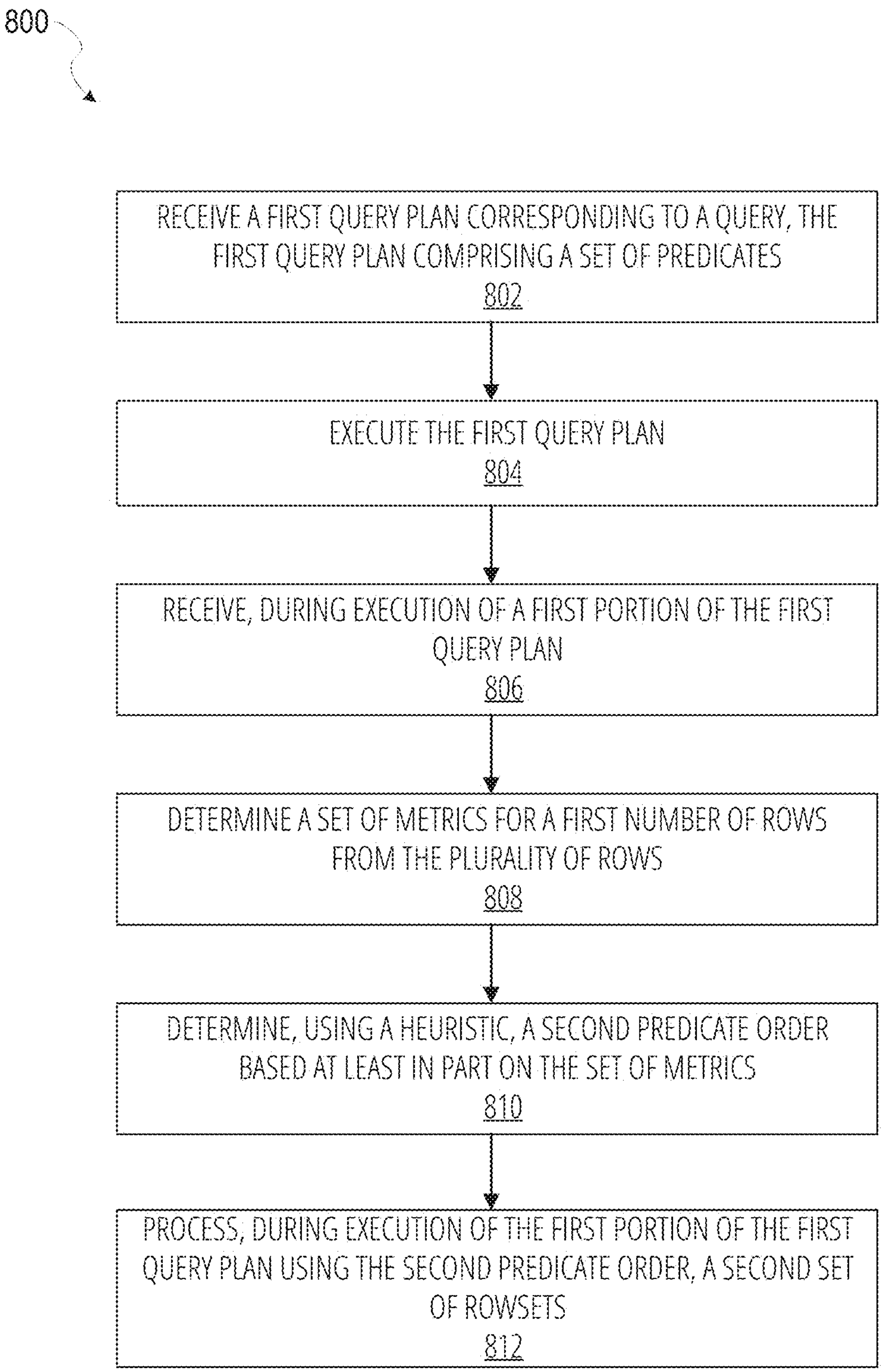
FIG. 8 is flow diagram illustrating operations of a database system in performing a method, in accordance with some embodiments of the present disclosure.

FIG. 8 is a flow diagram illustrating the operations of a database system in performing a method in accordance with some embodiments of the present disclosure. The method 800 may be embodied in computer-readable instructions for execution by one or more hardware components (e.g., one or more processors) such that the operations of the method 800 may be performed by components of network-based database system 102, such as components of the compute service manager 108. Accordingly, the method 800 is described below, by way of example with reference thereto. However, it shall be appreciated that the method 800 may be deployed on various other hardware configurations and is not intended to be limited to deployment within the network-based database system 102.

At operation 802, the execution node 302-1 receives a first query plan corresponding to a query, the first query plan comprising a set of predicates. At operation 804, the execution node 302-1 executes the first query plan. At operation 806, the execution node 302-1 receives, during execution of a first portion of the first query plan, a set of rowsets, the set of rowsets comprising a plurality of rows. At operation 808, the execution node 302-1 determines a set of metrics for a first number of rows from the plurality of rows, the first number of rows corresponding to a first predicate order. At operation 810, the execution node 302-1 determines, using a heuristic, a second predicate order based at least in part on the set of metrics. At operation 812, the execution node 302-1 processes, during execution of the first portion of the first query plan using the second predicate order, a second set of rowsets, the second set of rowsets comprising a second plurality of rows that correspond to the first portion of the first query plan that has been executed based on the second predicate order.

Figure 9:
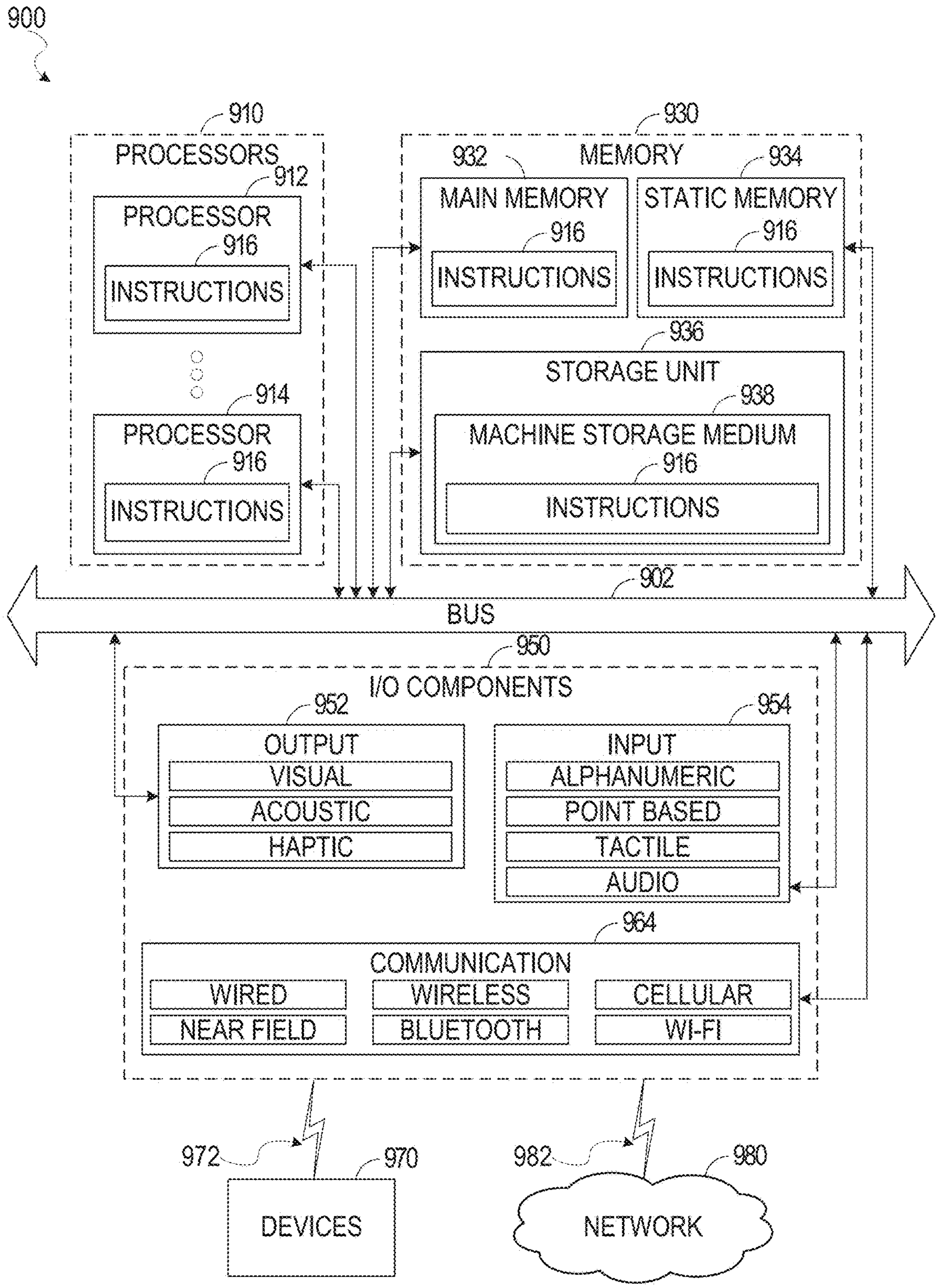
FIG. 9 illustrates a diagrammatic representation of a machine in the form of a computer system within which a set of instructions may be executed for causing the machine to perform any one or more of the methodologies discussed herein, in accordance with some embodiments of the present disclosure.

FIG. 9 illustrates a diagrammatic representation of a machine 900 in the form of a computer system within which a set of instructions may be executed for causing the machine 900 to perform any one or more of the methodologies discussed herein, according to an example embodiment. Specifically, FIG. 9 shows a diagrammatic representation of the machine 900 in the example form of a computer system, within which instructions 916 (e.g., software, a program, an application, an applet, an app, or other executable code) for causing the machine 900 to perform any one or more of the methodologies discussed herein may be executed. For example, the instructions 916 may cause the machine 900 to execute any one or more operations of a method. In this way, the instructions 916 transform a general, non-programmed machine into a particular machine 900 (e.g., the compute service manager 108 or a node in the execution platform 110) that is specially configured to carry out any one of the described and illustrated functions in the manner described herein.

In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 916, sequentially or otherwise, that specify actions to be taken by the machine 900. Further, while only a single machine 900 is illustrated, the term "machine" shall also be taken to include a collection of machines 900 that individually or jointly execute the instructions 916 to perform any one or more of the methodologies discussed herein.

The machine 900 includes processors 910, memory 930, and input/output (I/O) components 950 configured to communicate with each other such as via a bus 902. In an example embodiment, the processors 910 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 912 and a processor 914 that may execute the instructions 916. The term "processor" is intended to include multi-core processors 910 that may comprise two or more independent processors (sometimes referred to as "cores") that may execute instructions 916 contemporaneously. Although FIG. 9 shows multiple processors 910, the machine 900 may include a single processor with a single core, a single processor with multiple cores (e.g., a multi-core processor), multiple processors with a single core, multiple processors with multiple cores, or any combination thereof.

The memory 930 may include a main memory 932, a static memory 934, and a storage unit 936, all accessible to the processors 910 such as via the bus 902. The main memory 932, the static memory 934, and the storage unit 936 store the instructions 916 embodying any one or more of the methodologies or functions described herein. The instructions 916 may also reside, completely or partially, within the main memory 932, within the static memory 934, within machine storage medium 938 of the storage unit 936, within at least one of the processors 910 (e.g., within the processor's cache memory), or any suitable combination thereof, during execution thereof by the machine 900.

The I/O components 950 include components to receive input, provide output, produce output, transmit information, exchange information, capture measurements, and so on. The specific I/O components 950 that are included in a particular machine 900 will depend on the type of machine. For example, portable machines such as mobile phones will likely include a touch input device or other such input mechanisms, while a headless server machine will likely not include such a touch input device. It will be appreciated that the I/O components 950 may include many other components that are not shown in FIG. 9. The I/O components 950 are grouped according to functionality merely for simplifying the following discussion and the grouping is in no way limiting. In various example embodiments, the I/O components 950 may include output components 952 and input components 954. The output components 952 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 954 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 950 may include communication components 964 operable to couple the machine 900 to a network 980 or devices 970 via a coupling 982 and a coupling 972, respectively. For example, the communication components 964 may include a network interface component or another suitable device to interface with the network 980. In further examples, the communication components 964 may include wired communication components, wireless communication components, cellular communication components, and other communication components to provide communication via other modalities. The devices 970 may be another machine or any of a wide variety of peripheral devices (e.g., a peripheral device coupled via a universal serial bus (USB)). For example, as noted above, the machine 900 may correspond to any one of the compute service manager 108 or the execution platform 110, and the devices 970 may include the client device 114 or any other computing device described herein as being in communication with the network-based database system 102 or the cloud storage platform 104.

Executable Instructions and Machine Storage Medium

The various memories (e.g., 930, 932, 934, and/or memory of the processor(s) 910 and/or the storage unit 936) may store one or more sets of instructions 916 and data structures (e.g., software) embodying or utilized by any one or more of the methodologies or functions described herein. These instructions 916, when executed by the processor(s) 910, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 980 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 980 or a portion of the network 980 may include a wireless or cellular network, and the coupling 982 may be a Code Division Multiple Access (CDMA) connection, a Global System for Mobile communications (GSM) connection, or another type of cellular or wireless coupling. In this example, the coupling 982 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 916 may be transmitted or received over the network 980 using a transmission medium via a network interface device (e.g., a network interface component included in the communication components 964) and utilizing any one of a number of well-known transfer protocols (e.g., hypertext transfer protocol (HTTP)). Similarly, the instructions 916 may be transmitted or received using a transmission medium via the coupling 972 (e.g., a peer-to-peer coupling) to the devices 970. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 916 for execution by the machine 900, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of a method may be performed by one or more processors. The performance of certain of the operations may be distributed among the one or more processors, not only residing within a single machine, but also deployed across a number of machines. In some example embodiments, the processor or processors may be located in a single location (e.g., within a home environment, an office environment, or a server farm), while in other embodiments the processors may be distributed across a number of locations.

Conclusion

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A system comprising:

at least one hardware processor; and a memory storing instructions that cause the at least one hardware processor to perform operations comprising:

receiving a particular query plan corresponding to a query, the particular query plan comprising a set of predicates;

executing the particular query plan, the executing comprising:

receiving, during execution of an initial portion of the particular query plan, an initial set of rowsets, the initial set of rowsets comprising a particular plurality of rows;

determining a first set of metrics for a particular number of rows from the particular plurality of rows, the particular number of rows corresponding to a first default predicate order;

determining whether an improvement threshold has been met based at least in part on the first set of metrics;

in response to determining that the improvement threshold has been met, determining, using a heuristic, a new predicate order based at least in part on the first set of metrics; and processing, during execution of the initial portion of the particular query plan using the new predicate order, a subsequent set of rowsets, the subsequent set of rowsets comprising a different plurality of rows that correspond to the initial portion of the particular query plan that has been executed based on the new predicate order.

2. The system of claim 1, wherein the operations further comprise:

determining a second set of metrics for a second particular number of rows from the subsequent set of rowsets, the second particular number of rows corresponding to the new predicate order;

determining whether a second improvement threshold has been met based at least in part on the second set of metrics; and in response to determining that the second improvement threshold has been met, processing, during execution of the initial portion of the particular query plan using the new predicate order, a third set of rowsets, the third set of rowsets comprising a different plurality of rows that correspond to the initial portion of the particular query plan that has been executed based on the new predicate order.

3. The system of claim 2, wherein the operations further comprise:

processing, during execution of the initial portion of the particular query plan using the default predicate order, a fourth set of rowsets, the fourth set of rowsets comprising a third different plurality of rows that correspond to the initial portion of the particular query plan that has been executed based on the default predicate order; and processing, during execution of the initial portion of the particular query plan using the new predicate order, a fifth set of rowsets, the fifth set of rowsets comprising a fourth different plurality of rows that correspond to the initial portion of the particular query plan that has been executed based on the new predicate order.

4. The system of claim 3, wherein the operations further comprise:

determining a third set of metrics for the fourth different plurality of rows from the fifth set of rowsets;

determining whether the second improvement threshold has been met based at least in part on the third set of metrics; and in response to determining that the second improvement threshold has been met, processing, during execution of the initial portion of the particular query plan using the new predicate order, a sixth set of rowsets.

5. The system of claim 2, wherein the improvement threshold is a first value and the second improvement threshold is a second value, the first value and second value being different values.

6. The system of claim 2, wherein the operations further comprise:

in response to determining that the second improvement threshold has not been met, reverting from the new predicate order to the default predicate order for executing the query plan.

7. The system of claim 1, wherein the operations further comprise:

in response to determining that the improvement threshold has not been met, maintaining the default predicate order for executing the particular query plan.

8. The system of claim 1, wherein the set of metrics comprises an estimated selectivity metric for each predicate and a time cost per row for each predicate.

9. The system of claim 1, wherein the heuristic comprises a first technique and a second technique, the first technique utilized for a conjunctive query statement, and the second technique utilized for a disjunctive query statement.

10. A method comprising:

receiving a particular query plan corresponding to a query, the particular query plan comprising a set of predicates;

executing the particular query plan, the executing comprising:

receiving, during execution of an initial portion of the particular query plan, an initial set of rowsets, the initial set of rowsets comprising a particular plurality of rows;

determining a first set of metrics for a particular number of rows from the particular plurality of rows, the particular number of rows corresponding to a first default predicate order;

determining whether an improvement threshold has been met based at least in part on the first set of metrics;

in response to determining that the improvement threshold has been met, determining, using a heuristic, a new predicate order based at least in part on the first set of metrics; and processing, during execution of the initial portion of the particular query plan using the new predicate order, a subsequent set of rowsets, the subsequent set of rowsets comprising a different plurality of rows that correspond to the initial portion of the particular query plan that has been executed based on the new predicate order.

11. The method of claim 10, further comprising:

determining a second set of metrics for a second particular number of rows from the subsequent set of rowsets, the second particular number of rows corresponding to the new predicate order;

determining whether a second improvement threshold has been met based at least in part on the second set of metrics; and in response to determining that the second improvement threshold has been met, processing, during execution of the initial portion of the particular query plan using the new predicate order, a third set of rowsets, the third set of rowsets comprising a different plurality of rows that correspond to the initial portion of the particular query plan that has been executed based on the new predicate order.

12. The method of claim 11, further comprising:

processing, during execution of the initial portion of the particular query plan using the default predicate order, a fourth set of rowsets, the fourth set of rowsets comprising a third different plurality of rows that correspond to the initial portion of the particular query plan that has been executed based on the default predicate order; and processing, during execution of the initial portion of the particular query plan using the new predicate order, a fifth set of rowsets, the fifth set of rowsets comprising a fourth different plurality of rows that correspond to the initial portion of the particular query plan that has been executed based on the new predicate order.

13. The method of claim 12, further comprising:

determining a third set of metrics for the fourth different plurality of rows from the fifth set of rowsets;

determining whether the second improvement threshold has been met based at least in part on the third set of metrics; and in response to determining that the second improvement threshold has been met, processing, during execution of the initial portion of the particular query plan using the new predicate order, a sixth set of rowsets.

14. The method of claim 11, wherein the improvement threshold is a first value and the second improvement threshold is a second value, the first value and second value being different values.

15. The method of claim 11, further comprising:

in response to determining that the second improvement threshold has not been met, reverting from the new predicate order to the default predicate order for executing the query plan.

16. The method of claim 10, further comprising:

in response to determining that the improvement threshold has not been met, maintaining the default predicate order for executing the particular query plan.

17. The method of claim 10, wherein the set of metrics comprises an estimated selectivity metric for each predicate and a time cost per row for each predicate.

18. A non-transitory computer-storage medium comprising instructions that, when executed by one or more processors of a machine, configure the machine to perform operations comprising:

receiving a particular query plan corresponding to a query, the particular query plan comprising a set of predicates;

executing the particular query plan, the executing comprising:

receiving, during execution of an initial portion of the particular query plan, an initial set of rowsets, the initial set of rowsets comprising a particular plurality of rows;

determining a first set of metrics for a particular number of rows from the particular plurality of rows, the particular number of rows corresponding to a first default predicate order;

determining whether an improvement threshold has been met based at least in part on the first set of metrics;

in response to determining that the improvement threshold has been met, determining, using a heuristic, a new predicate order based at least in part on the first set of metrics; and processing, during execution of the initial portion of the particular query plan using the new predicate order, a subsequent set of rowsets, the subsequent set of rowsets comprising a different plurality of rows that correspond to the initial portion of the particular query plan that has been executed based on the new predicate order.

* * * * *